(12) United States Patent
Hamada

(10) Patent No.: US 6,583,762 B2
(45) Date of Patent: Jun. 24, 2003

(54) CHIP ANTENNA AND METHOD OF MANUFACTURING THE SAME

(75) Inventor: Hiroki Hamada, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 10/043,992

(22) Filed: Jan. 9, 2002

(65) Prior Publication Data

US 2002/0089456 A1 Jul. 11, 2002

(30) Foreign Application Priority Data

Jan. 11, 2001 (JP) ....................................... 2001-003530

(51) Int. Cl.[7] ................................................ H01Q 1/24
(52) U.S. Cl. ....................................................... 343/700
(58) Field of Search ......................... 343/700 MS, 702, 343/815, 817, 818, 873; 29/600

(56) References Cited

U.S. PATENT DOCUMENTS

| | | | | |
|---|---|---|---|---|
| 4,370,657 A | * | 1/1983 | Kaloi ................... | 343/700 MS |
| 5,220,335 A | * | 6/1993 | Huang .................. | 343/700 MS |
| 5,241,321 A | * | 8/1993 | Tsao ..................... | 343/700 MS |
| 5,307,556 A | | 5/1994 | Kido ..................... | 29/600 |
| 5,336,272 A | | 8/1994 | Tsutsumi et al. ..... | 29/25.01 |
| 5,371,044 A | | 12/1994 | Yoshida et al. ....... | 437/214 |
| 5,408,241 A | | 4/1995 | Shattuck, Jr. et al. . | 343/700 MS |
| 5,420,596 A | * | 5/1995 | Burrell et al. ........ | 343/700 MS |
| 5,781,158 A | * | 7/1998 | Ko et al. ............... | 343/700 MS |
| 5,985,185 A | | 11/1999 | Steijer et al. ......... | 264/1.7 |
| 6,002,369 A | | 12/1999 | Richard ................ | 343/700 MS |
| 6,018,299 A | * | 1/2000 | Eberhardt .............. | 340/572.7 |
| 6,195,049 B1 | * | 2/2001 | Kim et al. ............. | 343/700 MS |

FOREIGN PATENT DOCUMENTS

| | | |
|---|---|---|
| EP | 0 692 770 A | 1/1996 |
| EP | 0 696 079 A | 2/1996 |
| EP | 0 957 663 A | 11/1999 |
| JP | 11-127014 | 5/1999 |
| JP | 11 345297 | 12/1999 |
| WO | WO 92/00840 | 1/1992 |

OTHER PUBLICATIONS

Schrank, H. et al. "Tuning Stubs for Microstrip–Patch Antennas." IEEE Antennas and Propagation Magazine, IEEE Inc., New York, US, vol. 36, No. 6, Dec. 1, 1994, pp. 52–55.

European Search Report, Application No. 00 20 0557, Date of Completion May 28, 2002.

* cited by examiner

*Primary Examiner*—Tan Ho
(74) *Attorney, Agent, or Firm*—Knobbe, Martens, Olson & Bear, LLP

(57) ABSTRACT

A chip antenna is fabricated by forming a conductor plate having main and auxiliary antenna elements with a spacing therebetween which are connected through coupling portions to a frame surrounding the antenna elements, the conductor plate being embedded in or stacked on a dielectric chip and being cut along side faces of the dielectric chip. The main and auxiliary antenna elements have inner end edge portions that are opposed to each other over the entire width of the dielectric chip to provide a constant opposed area, suppressing a variation in antenna performance.

14 Claims, 6 Drawing Sheets

PRIOR ART

CHIP ANTENNA AND METHOD OF MANUFACTURING THE SAME

BACKGROUND OF THE INVENTION

1. Technical Field

The present invention relates to a chip antenna having main and auxiliary antenna elements juxtaposed to each other, and more particularly, to a chip antenna configured to reduce a variation in antenna performance and a method of manufacturing the same.

2. Related Art

An antenna having an antenna element of a plate-shaped or meander-shaped conductor embedded in or stacked on a dielectric chip is known. It is also known to provide an auxiliary passive antenna element juxtaposed with a main antenna element, to thereby broaden the bandwidth of an antenna or make an antenna having multi-resonance frequencies.

In the latter chip antenna, it is predicted that relative positions of the main and auxiliary antenna elements 1 and 2 are deviated from each other in the lateral or height direction as shown in FIG. 11 or 12 when the antenna elements 1, 2 are embedded in the dielectric chip 3. This applies to a case where the antenna elements 1, 2 are stacked on the dielectric chip 3.

Such a positional deviation between the antenna elements 1 and 2 varies the opposed or overlay area of the opposed end edge portions of the antenna elements, to cause a variation in capacitance (impedance) between the antenna elements 1 and 2, resulting in a change in antenna performance. As a consequence, it is predicted that difficulties will be encountered in manufacturing chip antennas which are uniform in antenna performance.

SUMMARY OF THE INVENTION

An object of the present invention is to provide a chip antenna having a main antenna element and an auxiliary passive antenna element that are juxtaposed to each other and being capable of easily and effectively suppressing a variation in antenna performance.

Another object of the invention is to provide a method of manufacturing a chip antenna which is provided with a main antenna element and an auxiliary passive antenna element and which is free from a variation in antenna performance.

According to one aspect of the present invention, there is provided a chip antenna which comprises a main antenna element and an auxiliary passive antenna element that are embedded into or stacked on a dielectric chip. The main antenna element has a first main body and first expanding portions individually extending outwardly from both ends of an inner end edge portion of the first main body in a width direction of the chip antenna. The auxiliary antenna element has a second main body and second expanding portions individually extending outwardly from both ends of an inner end edge portion of the second main body in the width direction of the chip antenna. The inner end edge portions of the main and auxiliary antenna elements, including the first and second expanding portions, respectively, are opposed to each other with a spacing therebetween in a lengthwise direction of the chip antenna.

According to the chip antenna of this invention, the inner or opposed end edge portions of the main and auxiliary antenna elements have the width size greater than that of the main body by the projecting length of the expanding portions. For instance, the width size is equal to or greater than the entire width of the dielectric chip. Thus, the inner end edge portions of the main and auxiliary antenna elements are opposed to each other over substantially the entire width of the dielectric chip, even if the antenna elements are subject to a positional deviation in the widthwise direction, so that the opposed area and hence the capacitance or impedance between the antenna elements may hardly change, whereby a variation in antenna performance is suppressed.

According to another aspect of the present invention, there is provided a method of manufacturing a chip antenna, which comprises: a first step of forming a conductor plate having a main antenna element that has a first main body and first expanding portions individually extending outwardly from both ends of an inner end side portion of the first main body, an auxiliary passive antenna element that has a second main body and second expanding portions individually extending outwardly from both ends of an inner end side portion of the second main body, and a coupling portion that couples the main and auxiliary antenna elements to each other, with the inner end edge portions of these antenna elements opposed to each other with a spacing therebetween in a lengthwise direction of the chip antenna; a second step of embedding or stacking the conductor plate into or on a dielectric chip; and a third step of cutting off the coupling portion of the conductor plate from the main and auxiliary antenna elements of the conductor plate embedded into or stacked on the dielectric chip, to thereby cut off the main and auxiliary antenna elements from each other.

With the chip antenna manufacturing method of this invention, a chip antenna having opposed end edge portions extending over at least the entire width of a dielectric chip can be easily and efficiently fabricated. That is, the antenna elements of a conductor plate formed in the first step are disposed in substantially the same plane, so that the opposed or inner end edge portions of the antenna elements are accurately opposed to each other with a predetermined spacing therebetween in the lengthwise direction. In the second step wherein the conductor plate is embedded into or stacked on the dielectric chip, the antenna elements are hardly subject to a positional deviation in any of the height, widthwise and lengthwise directions of the chip antenna since the antenna elements are kept coupled to each other by a coupling portion. Also in the third step, the main and auxiliary antenna elements are hardly subject to a positional deviation since the antenna elements formed in the conductor plate are cut off from each other by cutting off the coupling portion from the antenna elements in a state that the conductor plate is partly embedded into or stacked on the dielectric chip. As a consequence, a chip antenna, having the main and auxiliary antenna elements whose opposed or inner end edge portions are accurately opposed to each other and being free from a variation in antenna performance, can be easily and efficiently fabricated.

DETAILED DESCRIPTION

[First Embodiment]

Figure 1:
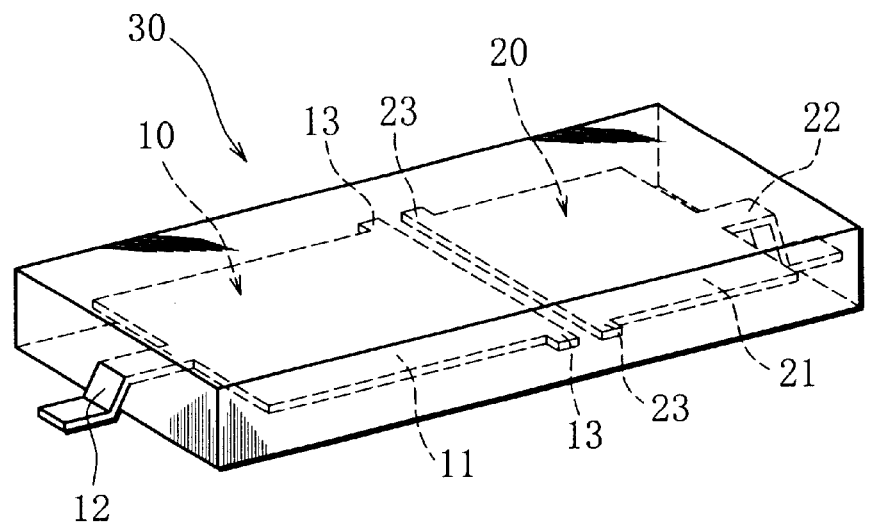
FIG. 1 is a schematic perspective view showing a chip antenna according to a first embodiment of this invention.

With reference to FIG. 1, a chip antenna according to a first embodiment of this invention will be described.

This chip antenna comprises main and auxiliary antenna elements 10 and 20 that are embedded into a dielectric chip 30 and positioned in substantially the same plane with a predetermined spacing therebetween in the lengthwise direction of the chip antenna. The main antenna element 10 performs an antenna function when supplied with electric power. On the other hand, the auxiliary antenna element 20, which is non-feed or passive element, serves as a parasitic element for the main antenna element 10. The antenna elements 10 and 20 realize a wideband antenna performance or multi-resonance frequencies.

The main antenna element 10 comprises a rectangular-shaped main body 11 of a predetermined area, and two expanding portions 13 formed integrally with the main body 11. The expanding portions 13 individually extend outwardly from both ends of an inner end edge portion (i.e., the end edge portion on the auxiliary-antenna-element side) of the main body 11 in the widthwise direction of the chip antenna. The inner end edge portion, including the expanding portions 13, of the main antenna element 10 has a width size equal to the entire width of the dielectric chip 30. The main antenna element 10 has an outer end edge thereof integrally formed with a feed terminal 12. An outer end portion of the feed terminal 12 projects from one of outer end faces of the dielectric chip 30 and is bent as shown in FIG. 1. The feed terminal 12, having a distal end portion thereof soldered to a printed circuit board (not shown), is used for power supply from the printed circuit board to the main antenna element 10 and serves as a mounting terminal used to mount the chip antenna on the printed circuit board.

The auxiliary antenna element 20 comprises a rectangular-shaped main body 21 of a predetermined area and two expanding portions 23 individually extend outwardly from both ends of an inner end edge portion of the main body 21. As in the main antenna element 10, the inner end edge portion, including the expanding portions 23, of the auxiliary antenna element 20 has a width size that is equal to the entire width of the dielectric chip 30. The auxiliary antenna element 20 is integrally formed at its outer end edge with a mounting terminal 22. The mounting terminal 22 has an outer end portion thereof projecting from another outer end face of the dielectric chip 30 and being bent as shown in FIG. 1. The mounting terminal 22 is soldered at a distal end portion to the printed circuit board and serves to mount the chip antenna on the printed circuit board.

The distance between the antenna elements 10, 20, the areas of the main bodies 11, 21, etc. may be determined in accordance with the resonance frequency, frequency band, antenna gain and the like of the chip antenna.

Figure 2:
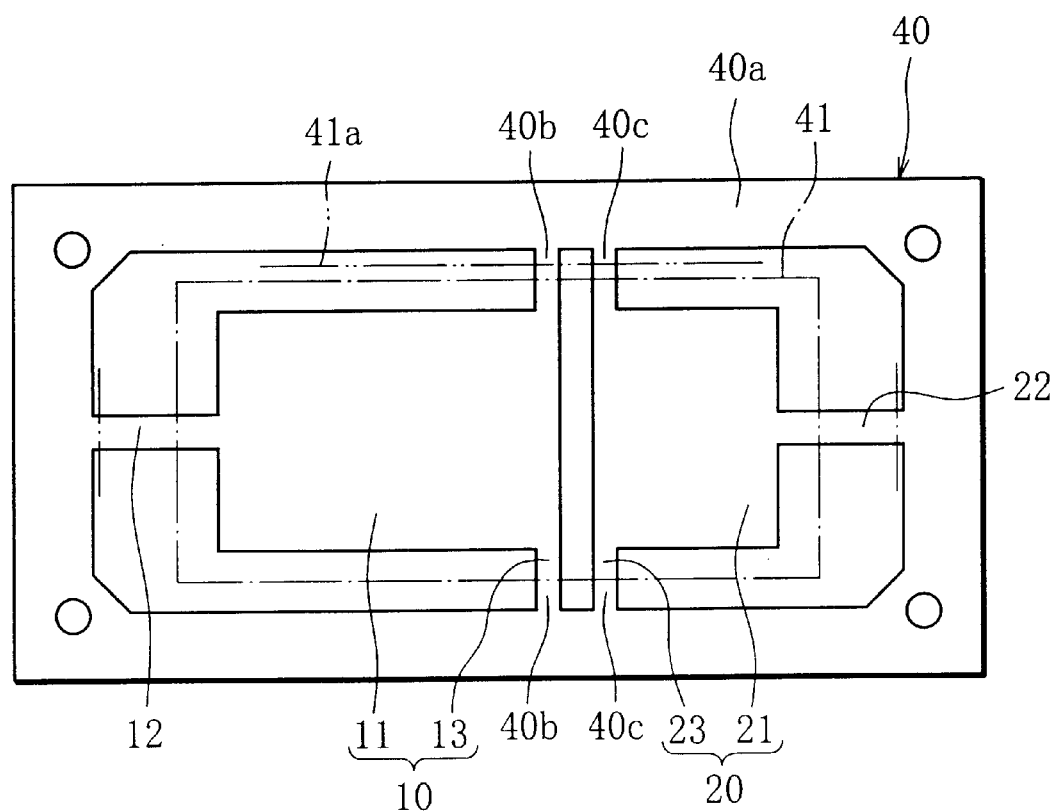
FIG. 2 is a plan view showing a processed conductor plate for use in the fabrication of the chip antenna shown in FIG. 1.

The chip antenna having the above construction is fabricated by way of example as follows:

First, a conductor plate (not shown) of a predetermined thickness is prepared that is made of a copper alloy or phospher bronze, which may be plated with pure copper, as desired. Then, the conductor plate is subjected to patterning by means of stamping, etching or the like, whereby a processed conductor plate 40 is formed as shown in FIG. 2, for instance (a first step). The processed conductor plate 40 is provided at its central part with main and auxiliary antenna elements 10, 20 and at its peripheral part with a frame 40a. Furthermore, the conductor plate 40 has two first coupling portions 40b thereof coupling the main antenna element 10 with the frame 40a and two second coupling portions 40c thereof coupling the auxiliary antenna element 20 with the frame 40a. The first coupling portions 40b individually extend between two expanding portions 12 of the main antenna element 10 and the frame 40a, whereas the second coupling portions 40 individually extend between two expanding portions 23 of the auxiliary antenna element 20 and the frame 40a. The frame 40a serves as a coupling portion which connects the antenna elements 10, 20 together in cooperation with the other coupling portions.

The feed terminal 12, which is integral with the main antenna element 10, has an extended distal end portion thereof integrally formed with the frame 40a, and serves as a third coupling portion which connects the main antenna element 10 with the frame 40a. Similarly, the mounting terminal 22 integral with the auxiliary antenna element 20 has an extended distal end portion thereof formed integrally with the frame 40a, and serves as a fourth coupling portion which connects the auxiliary antenna element 20 with the frame 40a.

In the conductor plate 40, the main and auxiliary antenna elements 10 and 20 are connected with each other through the coupling portions 40a, 40b, 40c, 12 and 22 in the above manner, with inner end edge portions of the antenna elements 10 and 20 opposed to each other with a spacing therebetween.

Figure 8:
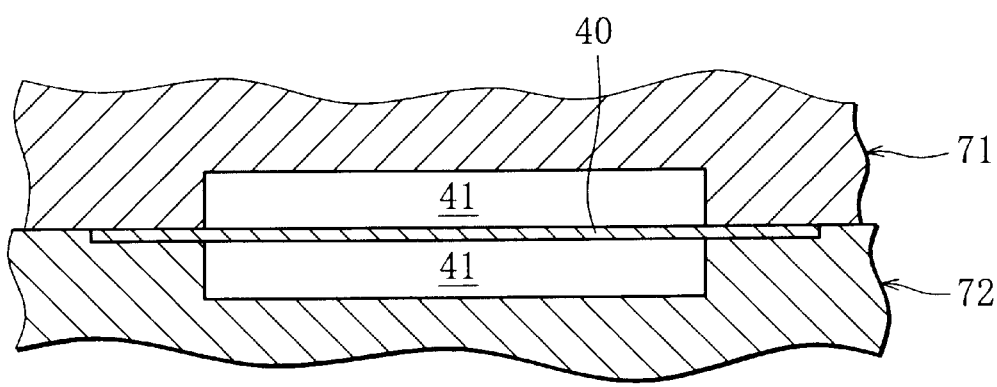
FIG. 8 is a fragmentary schematic cross-section view showing a die for use in the fabrication of the chip antenna shown in FIG. 1.

Next, the processed conductor plate 40 is installed in a resin molding die. In the case shown in FIG. 8, the conductor plate 40 is disposed in a conductor-plate placement area in a lower die half 72 of the molding die. Then, dielectric material having a predetermined dielectric constant is injected into the molding die (a second step). The molding die is comprised of upper and lower die halves 71, 72 including a cavity 41 that has a planar profile as shown by one-dotted chain line in FIG. 2. Since the conductor plate 40 is held between the upper and lower die halves 71 and 72, a positional deviation between the antenna elements 10 and 20 is suppressed, which would be otherwise caused by the injection of dielectric material. The dielectric material may be resin material such as LCP (liquid crystal polymer), a resin and ceramic composite material that is a mixture of PPS (polyphenylene sulfide) and BaO—Nd$_2$O$_3$—TiO$_2$—Bi$_2$O$_3$-based powder. The dielectric constant may be determined in the range from about 3.1 to about 20 depending on the antenna specification.

The dielectric chip 30 is formed in the above manner, so that the entirety of the main and auxiliary antenna elements 10, 20 and part of the feed terminal 12 and the mounting terminal 22 are embedded within the dielectric chip 30.

After cooling, a molded product (i.e., a semifinished chip antenna) in which the processed conductor plate 40 including the antenna elements 10, 20 is partly embedded is taken out of the molding die. Then, the conductor plate 40 is cut off along cutting lines (shown by one-dotted chain line in FIG. 2) which individually extend along and is located outside, by a predetermined distance, of the end faces of the dielectric chip 30, whereby the frame 40a is cut off from the terminals 12 and 22. Further, the conductor plate 40 is cut off along the side faces of the dielectric chip 30, whereby the frame 40a and the coupling portions 40b and 40c are separated from the main and auxiliary antenna elements 10 and 20 (a third step). As a result, the main and auxiliary antenna elements 10 and 20 are cut off from each other that have been formed into one piece through the coupling portions 40a, 40b and 40c.

Subsequently, the feed terminal 12 and the mounting terminal 22 that project from the end faces of the dielectric chip 30 are subject to bending as shown in FIG. 1, whereby a finished chip antenna is obtained.

With the aforementioned manufacturing method, the connection established between the antenna elements 10, 20 and the frame 40a through the coupling portions 40b, 40c, 12 and 22 is kept maintained during the fabrication of the chip antenna. Thus, the positions of the antenna elements 10 and 20 are hardly changed in any of the widthwise, lengthwise and height directions, whereby these antenna elements 10, 20 are held in such a positional relation that their inner end edge portions are accurately opposed to each other with a predetermined spacing therebetween. In particular, the main and auxiliary antenna elements 10, 20 can be embedded into the dielectric chip 30 without causing a change in relative position in any direction. As previously mentioned, the separation of the antenna elements 10, 20 from the frame 40a can be carried out by cutting the processed conductor plate 40 in a state that the antenna elements 10, 20 are embedded in the dielectric chip 30. During the fabrication of the chip antenna, therefore, the positional relationship between the antenna elements 10 and 20 hardly changes from the prescribed one.

In addition, the embedment of the antenna elements 10 and 20 into the dielectric chip 30 can be easily carried out by injecting dielectric material into a molding die having upper and lower die halves 71, 72 between which the processed conductor plate 40 is held. Moreover, the separation of the antenna elements 10, 20 from the coupling portions 40a, 40b and 40c of the processed conductor plate 40 can be made only by cutting the plate 40 along the side faces of the dielectric chip 30. In this manner, the fabrication process of the chip antenna is simple. Especially, an operation of adjusting the length of the opposed end edge portions of the main and auxiliary antenna elements to the entire width of the dielectric chip 30 can be easily achieved by cutting the processed conductor plate 40 as previously mentioned.

The chip antenna thus obtained is mounted onto a printed circuit board by soldering the feed terminal 12 and the mounting terminal 22 to the printed circuit board. When electric power is supplied from the printed circuit board through the feed terminal 12 to the main antenna element 11 of the chip antenna, an antenna function and a parasitic function for the main antenna element 10 are achieved by the main and auxiliary antenna elements 10 and 20, respectively.

With the chip antenna having the above structure, the inner end edge portions of the main and auxiliary antenna elements 10 and 20, having width sizes equal to the entire width of the dielectric chip 30, are opposed to each other over the entire width of the dielectric chip 30. Thus, the opposed area of the inner or opposed end edge portions of the antenna elements 10, 20 is kept constant, whereby the capacitance (impedance) between the antenna elements 10 and 20 is hardly deviated from the intended value, causing no substantial variation in antenna performance.

In particular, with a simple construction only required to have the expanding portions 13 and 23 provided in the opposed end edge portions of the antenna elements 10 and 20, a variation in antenna performance can be suppressed to enable the chip antenna to have a constant antenna performance without increasing the chip antenna size. This is practically advantageous. In addition, the expanding portions 13 and 23 do not project from the dielectric chip 30, preventing the expanding portions 13 and 23 from causing a change in antenna performance.

The chip antenna and the manufacturing method of the same according to the first embodiment may be modified variously.

Figure 3:
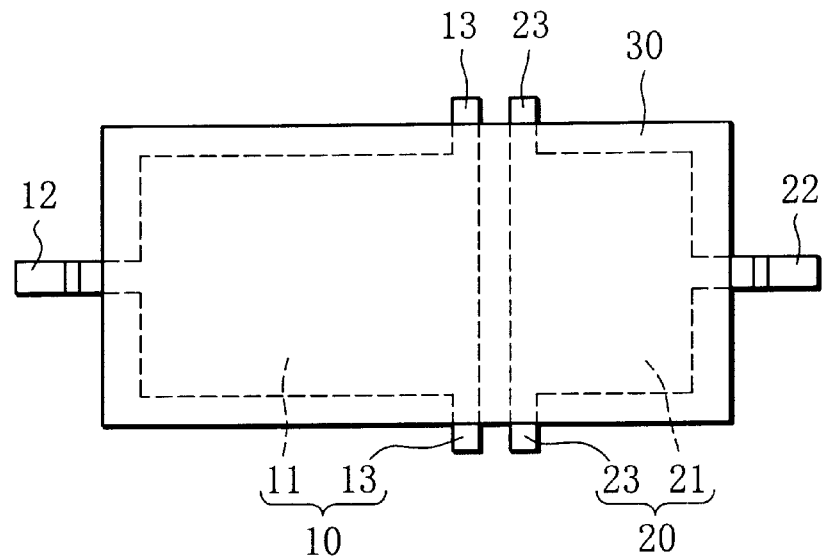
FIG. 3 is a schematic plan view showing a chip antenna according to a modification of the first embodiment.

FIG. 3 shows a chip antenna according to a modification of the first embodiment. This chip antenna is different from the one shown in FIG. 1 in that the expanding portions 13 and 23 of the main and auxiliary antenna elements 10 and 20 project from the side surfaces of the dielectric chip 30 to the outside. The chip antenna can be fabricated with use of, e.g., the processed conductor plate 40 shown in FIG. 2. In that case, the processed conductor plate 40 partly embedded in the dielectric chip 30 is cut off along cutting lines (part of which is shown by two-dotted chain line 41a in FIG. 2) located outside of the side faces of the dielectric chip 30 by a predetermined distance. Meanwhile, a fine adjustment of the antenna performance of the chip antenna can be made, e.g., by bending the projected expanding portions 13, 23 of the antenna elements 10, 20.

Figure 4:
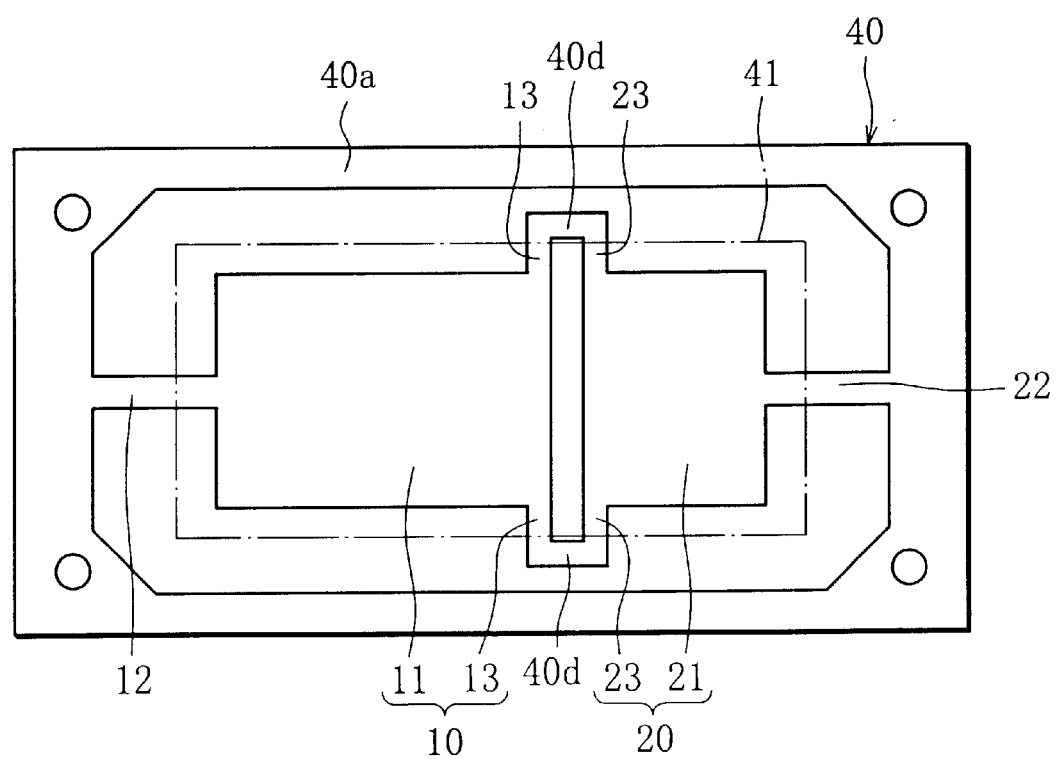
FIG. 4 is a plane view showing a processed conductor plate used for the fabrication of a chip antenna according to first or second embodiment of this invention.

For the fabrication of the chip antenna (FIG. 1) according to the first embodiment, a processed conductor plate 40 shown in FIG. 4 may be used instead of the processed conductor plate 40 shown in FIG. 2. The conductor plate 40 of FIG. 4 have the main and auxiliary antenna elements 10 and 20 coupled to each other by means of two coupling portions 40d, unlike the conductor plate 40 shown in FIG. 2 wherein the antenna elements 10 and 20 are coupled through the frame 40a and the coupling portions 40b and 40c that are four in total. The coupling portions 40d individually extend between the expanding portions 13 of the main antenna element 10 and the expanding portions 23 of the auxiliary antenna element 20. These coupling portions 40d serve to keep the antenna elements 10 and 20 in a condition that their inner end edge portions are opposed to each other with a predetermined spacing therebetween in the lengthwise direction of the chip antenna.

During the fabrication of the chip antenna, the antenna elements 10 and 20 are separated from the frame 40a of the conductor plate 40 to thereby separate the antenna elements 10 and 20 from each other by cutting off the processed conductor plate 40, partly embedded within the dielectric chip 30, along the side faces of the dielectric chip 30 and at extended distal end portions of the terminals 12, 22. As a result, the chip antenna where the inner end edge portions of the antenna elements 10, 20 are opposed to each other with the predetermined spacing therebetween.

[Second Embodiment]

Figure 5:
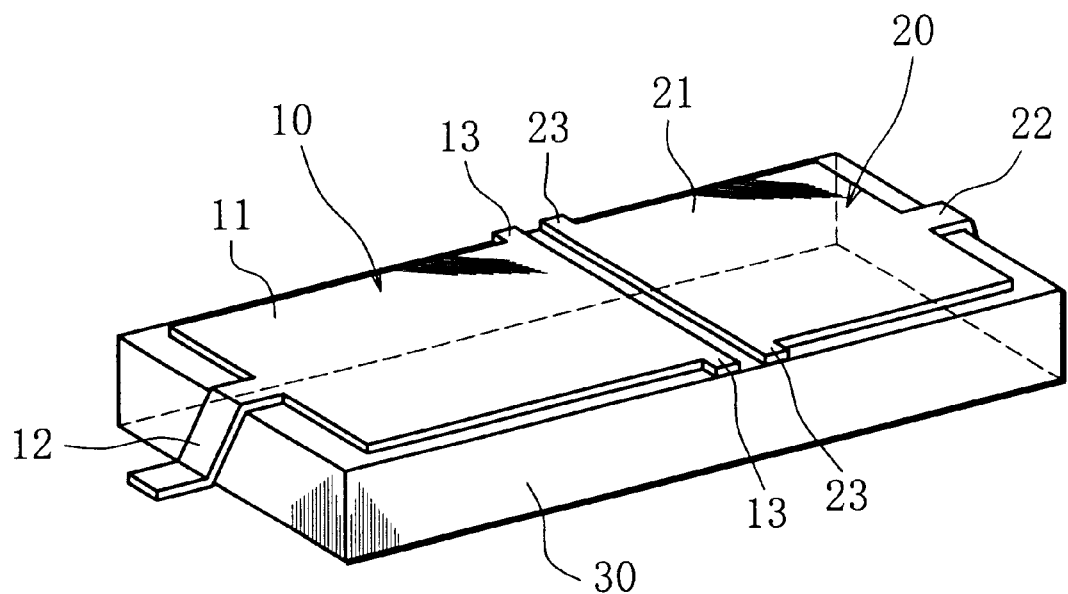
FIG. 5 is a schematic perspective view showing a chip antenna according to the second embodiment of this invention.

In the following, a chip antenna according to a second embodiment of this invention will be described with reference to FIG. 5.

Unlike the chip antenna of the first embodiment having the antenna elements 10 and 20 embedded into the dielectric chip 30, the antenna elements 10 and 20 of the chip antenna of the second embodiment are stacked on a surface of the dielectric chip 30.

Figure 9:
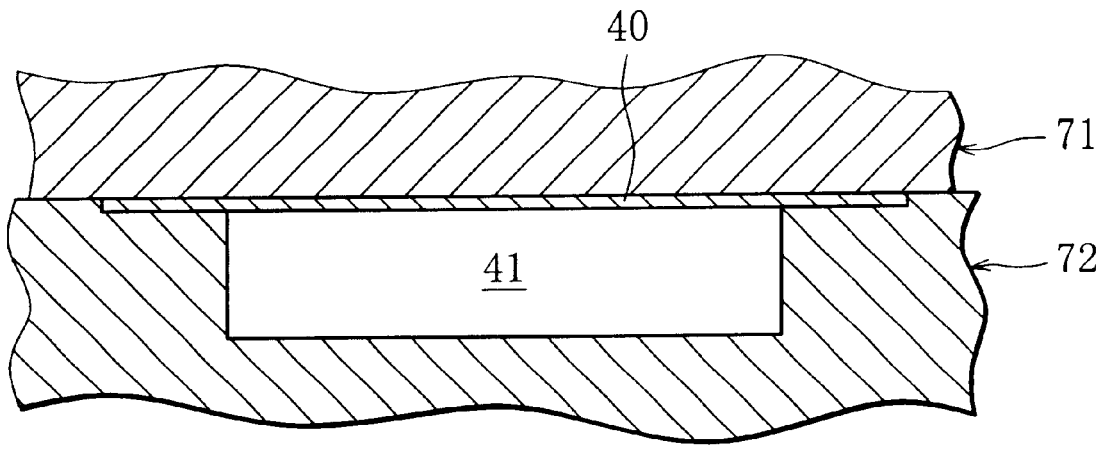
FIG. 9 is a fragmentary schematic cross-section view showing a die used for the fabrication of the chip antenna shown in FIG. 5.

As in the first embodiment, the chip antenna of this embodiment can be fabricated by use of the processed conductor plate 40 shown in FIG. 2 or 4. In that case, a resin molding die is prepared which comprises, as shown by way of example in FIG. 9, a lower die half 72 having therein a conductor-plate installation area and a cavity 41 and an upper die half 71 for holding the conductor plate 40 between itself and the lower die half 72. Then, dielectric material is injected into the cavity 41 of the molding die, whereby the processed conductor plate 40 is formed integrally with the surface of the dielectric chip 30. During the molding of the dielectric chip 30, a positional deviation between the antenna elements 10 and 20, which would be otherwise caused by the injection of dielectric material, can be suppressed since the conductor plate 40 is kept held between the upper and lower die halves 71, 72. Next, the semifinished chip antenna thus obtained is taken out of the molding die. Subsequently, the conductor plate 40 is subject to cutting along cutting lines located outside of the end faces of the dielectric chip 30 and along the side faces of the dielectric chip 30, whereby a finished chip antenna is obtained.

During the fabrication of the chip antenna, no substantial positional deviation is caused between the antenna elements 10 and 20 since these antenna elements are held in a state that their inner end edge portions are opposed to each other with a predetermined spacing therebetween, so that a chip antenna having the required performance can be manufactured with ease.

[Third Embodiment]

In the following, a chip antenna according to a third embodiment of this invention will be explained with reference to FIG. 6.

Figure 6:
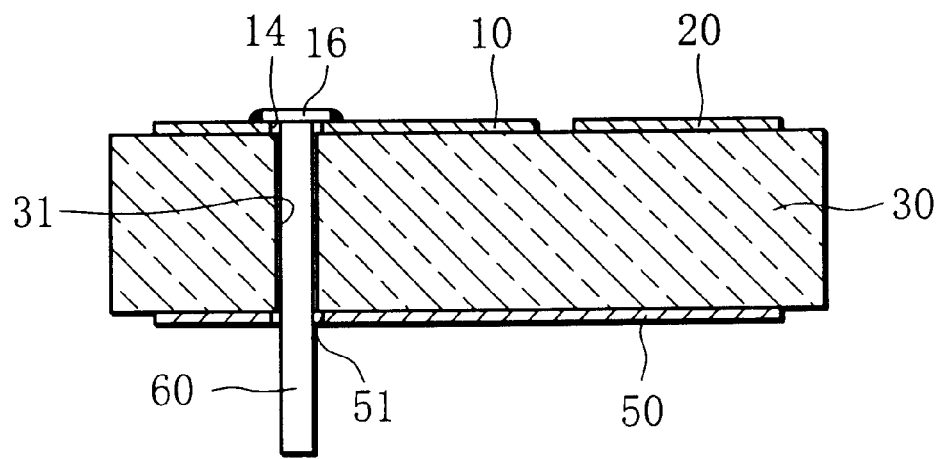
FIG. 6 is a schematic cross-section view showing a chip antenna according to a third embodiment of this invention taken along line VI—VI in FIG. 7.

As shown in FIG. 6, the chip antenna of this embodiment, having the basic arrangement similar to that of the second embodiment, has the main and auxiliary antenna elements 10 and 20 formed on a surface of the dielectric chip 30. As compared to the second embodiment, the chip antenna of this embodiment differs in that a grounding conductor 50 is formed on a bottom face of the dielectric chip 30 and that a feed pin 60 for power supply to the main antenna element 10 is provided.

The feed pin 60 vertically extends through the main antenna element 10, the dielectric chip 30 and the grounding conductor 50, while passing through a pin insertion hole 14 formed in a central part of the main body 11 of the main antenna element 10 and through pin insertion holes 31 and 51 individually formed in the dielectric chip 30 and the grounding conductor 50 in alignment with the pin insertion hole 14. The feed pin 60 has a head portion thereof soldered to the main body 11 of the main antenna element 10 so as to be electrically and physically connected therewith. A lower end portion of the feed pin 60 is adapted to be connected with a feed wire (not shown) for power supply to the main antenna element 10.

Figure 7:
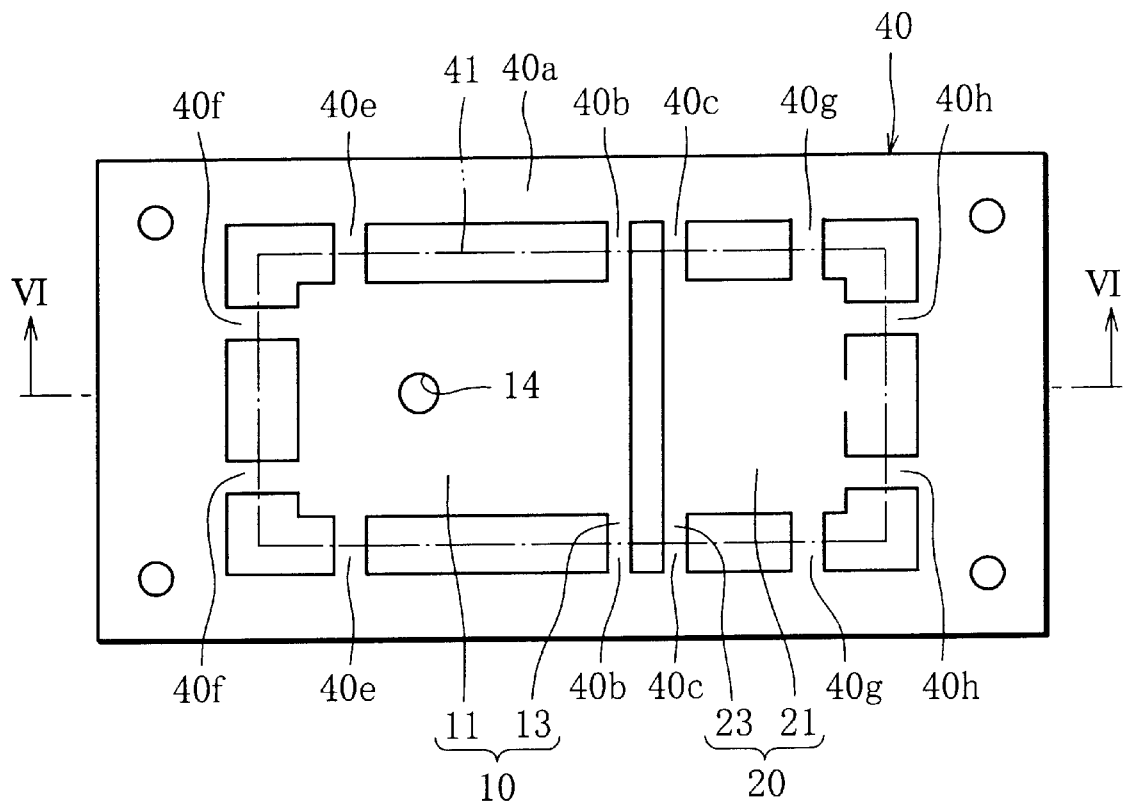
FIG. 7 is a plan view showing a processed conductor plate used for the fabrication of the chip antenna shown in FIG. 6.

The chip antenna having the aforementioned construction can be fabricated with use of the processed conductor plate 40 shown by way of example in FIG. 7. The processed conductor plate 40 is provided at its central part with the main and auxiliary antenna elements 10, 20 and at its peripheral part with a frame 40a. The conductor plate 40 is formed with coupling portions 40b, 40c and 40e to 40h through which the antenna elements 10 and 20 are coupled to the frame 40a. As in the conductor plate 40 shown in FIG. 2, the coupling portions 40b and 40c extend between the expanding portions 13, 23 of the antenna elements 10, 20 and the frame 40a. The coupling portions 40f and 40h, corresponding to the terminals 12 and 22 shown in FIG. 2, extend between the main bodies 11, 21 of the antenna elements 10, 20 and the frame 40a. The conductor plate 40 shown in FIG. 7 further comprises the coupling portions 40e and 40g extending outwardly from the side edges of the main bodies 11, 21 of the antenna elements 10, 20 to the frame 40, so as to positively prevent a positional deviation between the antenna elements 10 and 20.

Figure 10:
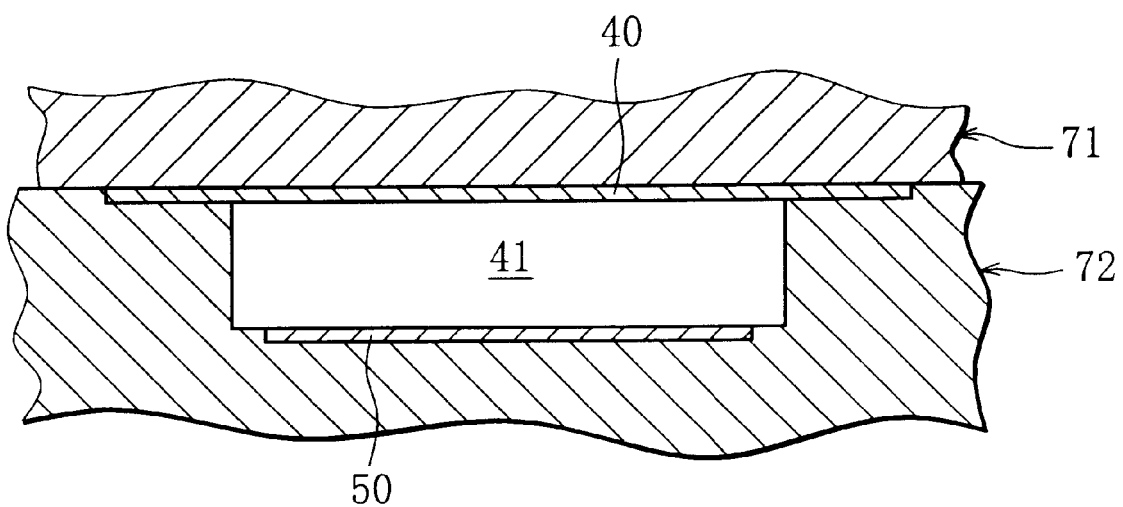
FIG. 10 is fragmentary schematic cross-section view showing a die used for the fabrication of the chip antenna shown in FIG. 6.
Figure 11:
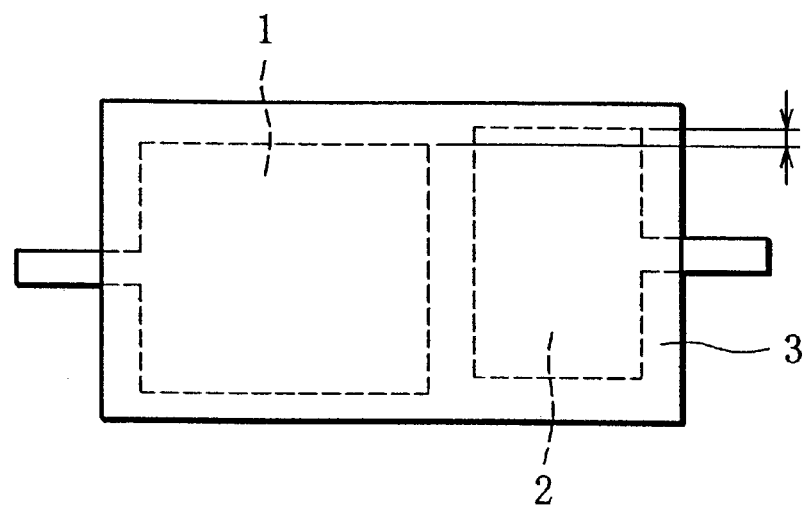
FIG. 11 is a plan view showing a positional deviation in the widthwise direction between main and auxiliary antenna elements of a conventional chip antenna.
Figure 12:
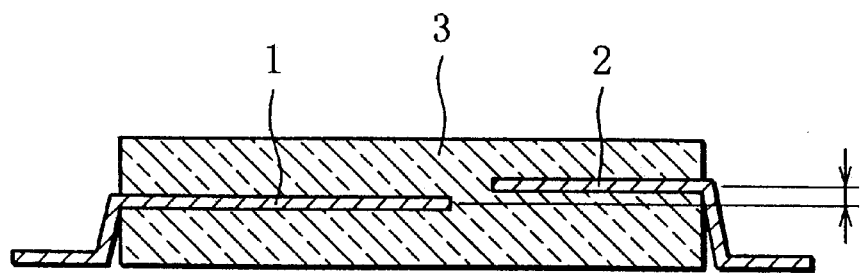
FIG. 12 is a vertical cross-section view showing a positional deviation in the height direction between the antenna elements of the chip antenna shown in FIG. 11.

In the case of fabricating the chip antenna of FIG. 6 with use of the conductor plate 40 shown in FIG. 7, the grounding conductor 50 is disposed on the bottom face of a cavity 41 formed in a lower die half 72 of a molding die, as shown in FIG. 10. Then, dielectric material is injected into the cavity 41 in the molding die, with a processed conductor plate 40 held between the upper and lower die halves 71 and 72. A semifinished chip antenna thus obtained is taken out of the molding die, and the conductor plate 40 is cut off along the side faces and end faces of the dielectric chip 30, whereby a finished chip antenna is obtained. During the fabrication of the chip antenna, the antenna elements 10 and 20 are kept maintained in a state that their inner end edge portions are opposed to each other with a spacing therebetween. Thus, no positional deviation is caused between the antenna elements, making it easy to fabricate a chip antenna having the required performance.

The present invention is not limited to the first to third embodiment and may be modified variously.

For instance, in the embodiments, the chip antenna is obtained by cutting the conductor plate integrally formed with the main and auxiliary antenna elements and embedded within or stacked on the dielectric chip. Alternatively, main and auxiliary antenna elements that are fabricated separately from each other may be embedded in or stacked on the dielectric chip. In this case, the projection length of expanding portions from the main bodies of the antenna elements 10, 20 are determined to have extended expanding portions, and the extended expanding portions are cut off along the side faces of the dielectric chip or along cutting lines located outside of these side faces, whereby the inner end edge portions of the antenna elements can be opposed to each other over at least the entire width of the dielectric chip.

In other respects, the present invention can be modified in various manner without departing from the scope of the invention.

What is claimed is:

1. A chip antenna comprising a main antenna element and an auxiliary passive antenna element that are embedded into or stacked on a dielectric chip, the improvement comprising:

said main antenna element having a first main body and first expanding portions individually extending outwardly from both ends of an inner end edge portion of the first main body in a width direction of the chip antenna;

said auxiliary antenna element having a second main body and second expanding portions individually extending outwardly from both ends of an inner end edge portion of the second main body in the width direction of the chip antenna; and said inner end edge portions of the main and auxiliary antenna elements, including the first and second expanding portions, respectively, being opposed to each other with a spacing therebetween in a lengthwise direction of the chip antenna.

2. The chip antenna according to claim 1, wherein the inner end edge portion of each of said main and auxiliary antenna elements has a width size equal to an entire width of said dielectric chip.

3. The chip antenna according to claim 1, wherein said first and second expanding portions extend outwardly from side faces of said dielectric chip in the width direction of the chip antenna.

4. The chip antenna according to claim 1, further comprising:

a feed terminal extending outwardly from an end edge of said first main body on a side remote from said auxiliary antenna element in a lengthwise direction of the chip antenna.

5. The chip antenna according to claim 4, further comprising:

a mounting terminal extending outwardly from an end edge of said second main body on a side remote from said main antenna element in the lengthwise direction of the chip antenna.

6. The chip antenna according to claim 1, wherein said main and auxiliary antenna elements are stacked on a surface of said dielectric chip; and said chip antenna further comprises a grounding conductor formed on a rear surface of said dielectric chip, and a feed pin vertically extends through said main antenna element, said dielectric chip and said grounding conductor, said feed pin being connected to said first main body.

7. A chip antenna manufacturing method, comprising:

a first step of forming a conductor plate having a main antenna element that has a first main body and first expanding portions individually extending outwardly from both side ends of an inner end side portion of the first main body, an auxiliary passive antenna element that has a second main body and second expanding portions individually extending outwardly from both ends of an inner end side portion of the second main body, and a coupling portion that couples the main and auxiliary antenna elements to each other, with the inner end edge portions of these antenna elements opposed to each other with a spacing therebetween in a lengthwise direction of the chip antenna;

a second step of embedding or stacking the conductor plate into or on a dielectric chip; and a third step of cutting off the coupling portion of the conductor plate from the main and auxiliary antenna elements of the conductor plate embedded into or stacked on the dielectric chip, to thereby cut off the main and auxiliary antenna elements from each other.

8. The chip antenna manufacturing method according to claim 7, wherein said coupling portion of said conductor plate formed in said first step includes a frame surrounding said main and auxiliary antenna elements, a first coupling portion that connects said first expanding portion with said frame, and a second coupling portion that connects said second expanding portion with said frame.

9. The chip antenna manufacturing method according to claim 8, wherein said conductor plate formed in said first step includes a third coupling portion that connects said first main body with said frame at an end edge of said first main body on a side remote from said auxiliary antenna element, and a fourth coupling portion that connects said second main body with said frame at an end edge of said second main body on a side remote from said main antenna element.

10. The chip antenna manufacturing method according to claim 9, wherein said conductor plate formed in said first step includes a fifth coupling portion that connects said first main body with said frame at a side edge of said first main body, and a sixth coupling portion that connects said second main body with said frame at a side edge of said second main body.

11. The chip antenna manufacturing method according to claim 8, wherein said third step includes cutting said conductor plate along side faces of said dielectric chip, to thereby separating said first and second coupling portions from said first and second expanding portions, respectively.

12. The chip antenna manufacturing method according to claim 8, wherein said third step includes cutting said conductor plate along cutting lines located outside of side faces of said dielectric chip, to thereby separate said first and second coupling portions from said first and second expanding portions, respectively.

13. The chip antenna manufacturing method according to claim 7, wherein said coupling portion of said conductor plate formed in said first step connects said first and second expanding portions together.

14. The chip antenna manufacturing method according to claim 7, wherein said second step includes injecting dielectric material into a molding die in which said conductor plate is disposed beforehand, whereby said conductor plate is embedded into said dielectric chip or stacked on a surface of said dielectric chip.

* * * * *